United States Patent
Helgesen et al.

(10) Patent No.: US 7,266,819 B2
(45) Date of Patent: Sep. 4, 2007

(54) METHOD FOR AUTOMATION OF SOFTWARE UPGRADE

(75) Inventors: Jan Ingvard Helgesen, Oslo (NO); Stefano Angelo Donati, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 602 days.

(21) Appl. No.: 10/312,392

(22) PCT Filed: Jun. 21, 2001

(86) PCT No.: PCT/SE01/01417

§ 371 (c)(1),
(2), (4) Date: Dec. 26, 2002

(87) PCT Pub. No.: WO02/01353

PCT Pub. Date: Jan. 3, 2002

(65) Prior Publication Data
US 2003/0093688 A1    May 15, 2003

(30) Foreign Application Priority Data
Jun. 28, 2000    (NO) ................................. 20003375

(51) Int. Cl.
*G06F 9/445* (2006.01)
(52) U.S. Cl. ..................... 717/176; 717/168; 717/171; 717/173; 717/174; 717/175; 717/177; 717/178; 709/217; 709/219; 709/223
(58) Field of Classification Search ........ 709/217–223; 713/191; 455/433, 435.1, 426; 717/121–178
See application file for complete search history.

(56) References Cited
U.S. PATENT DOCUMENTS
5,421,017 A    5/1995 Scholz et al.
(Continued)

FOREIGN PATENT DOCUMENTS
EP    0945792    9/1999
WO    WO92/22870    12/1992
WO    WO 00/18145    3/2000

OTHER PUBLICATIONS

Sunaga, H. et al. Applicability evaluation of service feature enhancementusing the partial-file "plug-in" modification technique. Communications, 1996.ICC '96, Conference Record, Converging Technologies for Tomorrow's Applications. 1996 IEEE International Conference on, vol. 1, 1996. pp. 32-36, vol. 1. See paragraph 2.2.2(4), 2.2.2.(4), 3.2.
"Install Shield" documents; http://www.macrovision.com/products/index.shtml website printed on Jan. 19, 2006.

* cited by examiner

Primary Examiner—Meng-Al T. An
Assistant Examiner—Mark P. Francis
(74) Attorney, Agent, or Firm—Nixon & Vanderhye P.C.

(57) ABSTRACT

The present invention relates to a method for automation of software upgrade of network elements in data and communication networks. In a preferred embodiment of the present invention, an upgrade of network elements in a communication system is controlled from one certain workstation. Before the actual activation of the new software of the network elements takes place, the hardware configuration (5) is validated ensuring that the new software is loadable in the hardware. The software configuration is then also validated ensuring that the new software and the existing software are compatible. A health check is then executed investigating whether the status of the network elements is as required. Then, the certain workstation from which the upgrade is controlled is assigned exclusive network administration access to the network elements. Assuming that the above mentioned is carried through successfully, the actual activation of the new software is executed. Thereafter, the exclusive access which was assigned to the workstation is released, and before cleaning up and terminating, post validation and post health checks are executed.

17 Claims, 2 Drawing Sheets

U.S. PATENT DOCUMENTS

| | | |
|---|---|---|
| 5,495,610 A | 2/1996 | Shing et al. |
| 5,602,993 A | 2/1997 | Stromberg |
| 5,682,533 A | 10/1997 | Siljestroemer |
| 5,742,829 A * | 4/1998 | Davis et al. ................ 717/178 |
| 5,805,891 A | 9/1998 | Bizuneh et al. |
| 5,867,714 A | 2/1999 | Todd et al. |
| 6,047,129 A | 4/2000 | Frye |
| 6,363,421 B2 * | 3/2002 | Barker et al. ............... 709/223 |
| 6,473,794 B1 * | 10/2002 | Guheen et al. ............. 709/223 |
| 6,564,369 B1 * | 5/2003 | Hove et al. ................. 717/121 |
| 6,603,970 B1 * | 8/2003 | Huelamo Platas et al. .. 455/433 |
| 6,684,243 B1 * | 1/2004 | Euget et al. ................ 709/222 |
| 6,698,018 B1 * | 2/2004 | Zimniewicz et al. ........ 717/175 |
| 2002/0049054 A1 * | 4/2002 | O'Connor et al. .......... 455/426 |
| 2004/0003266 A1 * | 1/2004 | Moshir et al. .............. 713/191 |
| 2005/0165906 A1 * | 7/2005 | Deo et al. ................... 709/217 |

Figure 1 Remote Upgrade Station
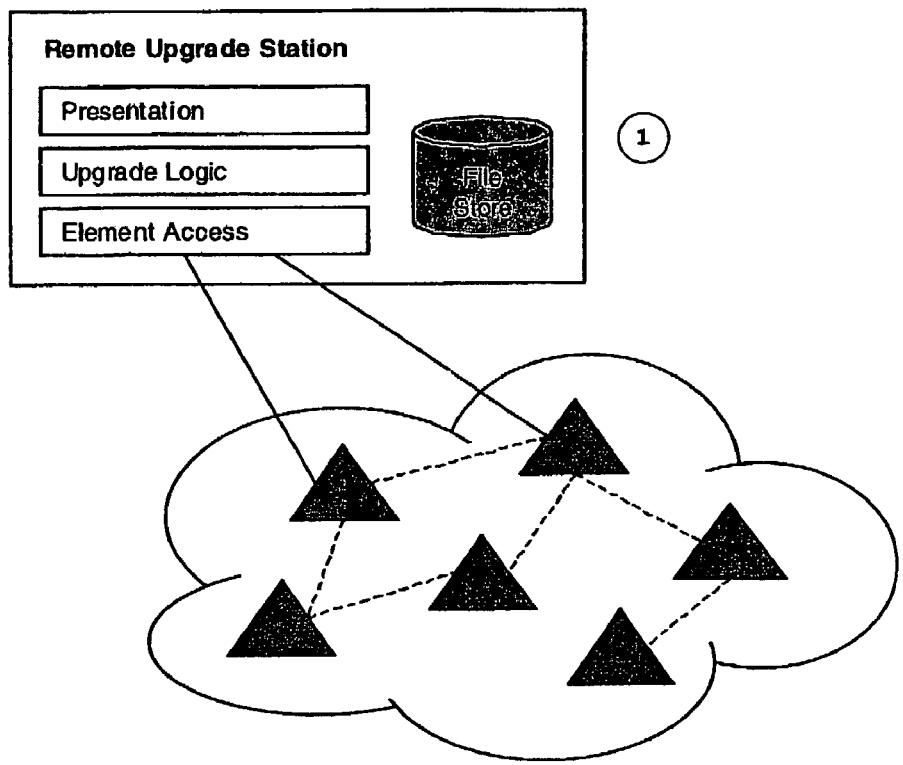
Figure 2 Network Element
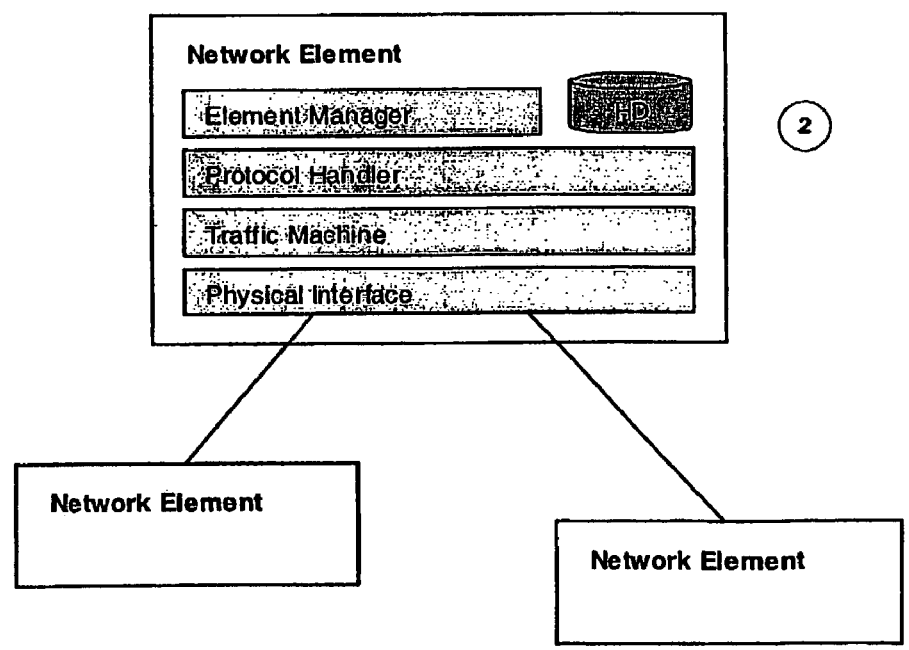

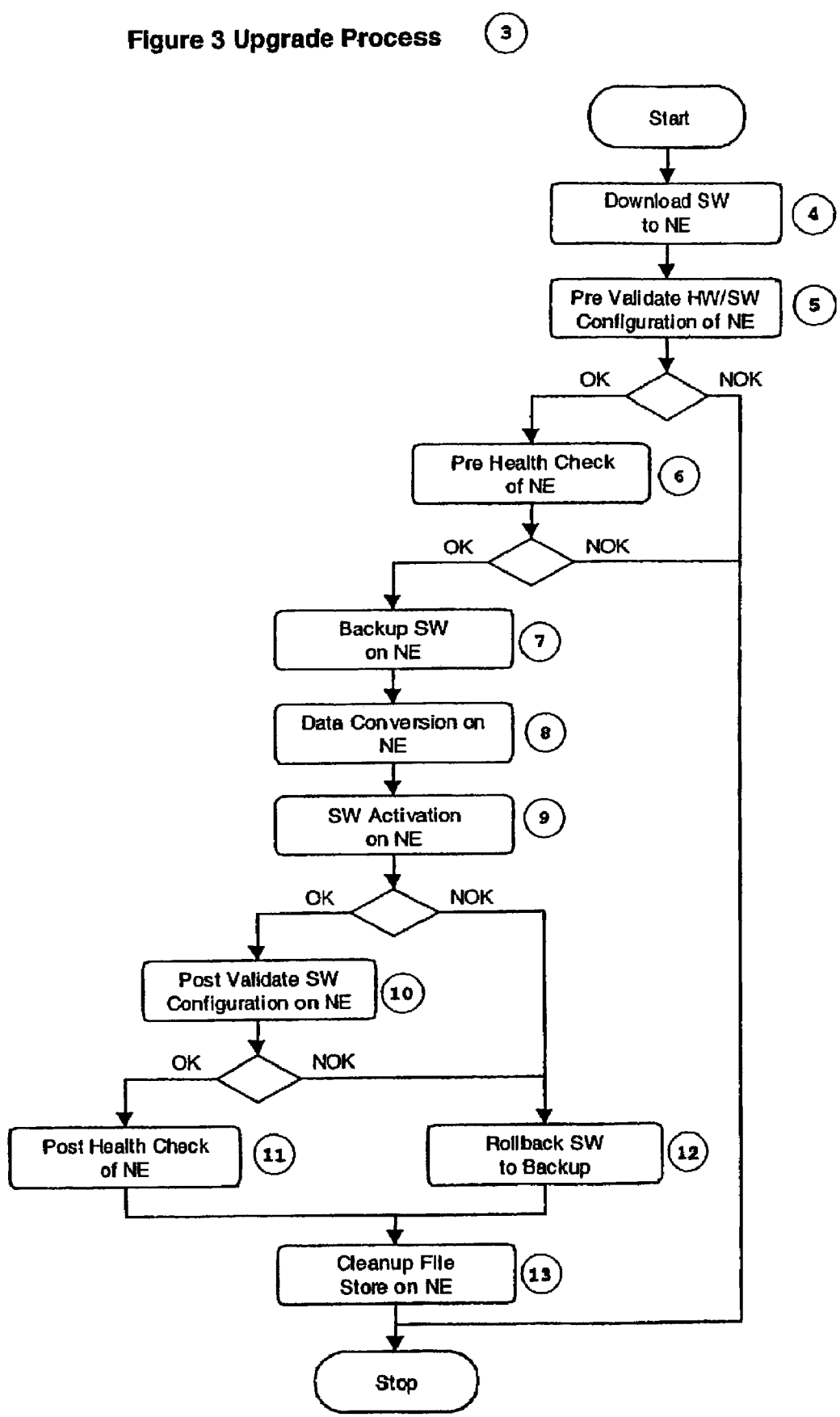
Figure 3 Upgrade Process

METHOD FOR AUTOMATION OF SOFTWARE UPGRADE

This is a national stage application corresponding to the PCT International Application No. PCT/SE01/01417, filed on Jun. 21, 2001, which claims priority from the Norwegian Patent Application 2003375, filed on Jun. 28, 2000, the contents of which are incorporated by reference.

FIELD OF THE INVENTION

The present invention relates to a method for automatic software upgrade of network elements, in particular for use in data and telecommunication network.

BACKGROUND OF THE INVENTION

A data or telecommunications network consists of a number of network elements interconnected by physical connections. Network elements implement routing, switching and transport functions that are required to establish communication between two or more network end-points.

In addition, network elements may implement application functions like multimedia telephony or unified messaging, which provide additional value for the end-user beyond basic end-to-end connectivity. In traditional telecommunication networks, the number of different types of network elements has been quite small, because network functions spanning from transport to the application layer have been integrated in a single element.

However, following the convergence of data and telecommunication technologies, the number of different network element types is increasing. Ericsson and other vendors are dividing the next generation network into connectivity, control and application layers, with a large number of specialized network element types at each layer. The next generation network enables the operator to decrease time-to-market for new services, and differentiate current service offerings more effectively.

Network traffic is increasing rapidly in access and carrier networks world-wide, which implies that the number of network elements is growing fast in order to handle the increased network load. This and the fact that network elements are becoming more specialized require more effective operation and maintenance of the network.

In large operator networks with thousands of network elements, software upgrade is both a time-consuming and complex process. The complexity of the upgrade process makes it difficult to roll out software on several elements in parallel, because the operator needs to manually supervise every step of the process.

The software upgrade process is also often complicated by dependencies between software modules. There may be dependencies on the version of other software modules that need to be resolved before upgrade can commence. There are also runtime dependencies between software modules, which implies that a software module may not be upgraded while another is running. In addition, the upgrade process is complicated by dependencies between software modules and the underlying hardware that executes the software.

Exceptional situations may also frequently occur during the upgrade process, which require special attention or even rollback of some or all steps performed up to that point.

As described above, next generation networks will include a large number of network elements based on different hardware platforms. This further complicates the software upgrade process, since it requires experience on several different hardware platforms. In the current situation, experience is required only on a small number of different platforms, e.g. the AXE platform for Ericsson's network elements. However, this is about to change and for next generation, Ericsson is introducing Cello, TelORB, Ronja, Erlang OTP and Tigris platforms. The situation is also similar for other vendors.

Another problem of today's upgrading methods is that education of operation and maintenance staff on every new platform is expensive. In addition, software upgrading is in great extent performed manually at the network element site or remotely from an operation and maintenance center. The problem with the manual approach is that experienced operators are required to control the process, and such individuals are often a scarce resource that should not be used for routine like operations. In addition, humans cannot control more than a few upgrades in parallel, whereas computer programs can control a large amount in parallel.

There are IT applications which produce software packages used to install software components on general-purpose computers, e.g. InstallShield® from InstallShield Software Corporation Inc. These applications produce software packages that contain scripts to interact with the user and copy the software into the system. It is also common to include scripts to remove software from the system. Since a network element may be seen as a special-purpose computer, these IT applications should be regarded as known solutions.

Current script based solutions can be used to install software on a single network element, but there are no known solutions for automating the entire upgrade process. The latter is required to upgrade software on several network elements in parallel. The problem is that any number of exceptional situations may arise during the upgrade process.

European Patent Application EP 0 945 792 A2, held by Sun Microsystems Inc., describes a technique for implementing a framework for extensible applications. Using the framework, a software module which installs itself within an application can be developed. In this context, one may regard a network element as an "application", thus the patent could be used for software upgrade of network elements.

However, no known network elements are based on the framework proposed here, and for this reason, this patent proposes no solution to the software upgrade problem of existing network elements. Also, it is not likely that future network elements will implement this framework.

International Patent Application PCT/SE92/00411, held by ICL Data AB, describes a "method and system for revising data in a distributed data communication system". The following procedure is described in the patent to perform an installation or upgrade of data. In this context, software may be regarded as data.

1. Establish a list of destination devices
2. Establish a procedure for the revision of data on selected destination devices, and store this as a revision recipe.
3. Create a data package with the data to be revised and the revision recipe.
4. The data package is distributed to selected destination devices.
5. The selected destination devices interpret the information in the data package by means of a special interpreter program installed in each device.

The above patent concerns only installation or upgrade of workstations in a distributed data communication system.

There are different non-functional requirements for upgrade of workstations and network elements. For instance, downtime may be accepted for workstations, while this is unacceptable for network elements, i.e. the upgrade must be performed while traffic is running.

The object of the present invention is to provide a method eliminating the drawbacks described above.

More specifically, a main object of the present invention is to simplify the complex and time-consuming upgrade process in a data or telecommunication network including a large number of network elements by introducing automatic software upgrade of the elements.

Another object of the invention is that it provides the required fault tolerance during the upgrade process to ensure that special attention or even rollback of some or all steps performed up to a certain point takes place. This is achieved by dividing the process in a number of steps, where each step must complete successfully before proceeding with the next.

A further object of the invention is that it minimizes the need for expensive, manual intervention by expert operators.

The present invention also overcomes the drawbacks of the mentioned international Patent Application PCT/SE92/00411, e.g. the scope of the present invention is upgrade of network elements that carry the traffic in the communication system, and no downtime for the elements while upgrading is required.

SUMMARY OF THE INVENTION

The above objects are achieved by a method characterized in the features defined by the characterizing part of claim 1.

In particular, the present invention relates to a method for automatic software upgrade of network elements, for use in data and telecommunication network. It describes a technique that makes is possible to automate the upgrade process, i.e. run the software upgrade without operator intervention. The technique includes the following steps:

health checks of the upgrade target,
validation of the hardware/software configuration,
backup,
data conversion,
activation, and
cleanup.

These steps are partly executed prior to and after activation of the software on the upgrade target. This is in order to make sure that the required conditions to initiate the activation are met, and to make sure that the activation has indeed been successful.

BRIEF DESCRIPTION OF THE DRAWINGS

In order that the invention may be more readily understood, the method will in the following be described with reference to the accompanying drawings.

FIG. 1 illustrates a sample upgrade station and the communication towards network elements, FIG. 2 illustrates major components in a network element, FIG. 3 is a float diagram illustrating the steps involved in the upgrade process.

DETAILED DESCRIPTION

With reference to the abovementioned figures, in the following, an example of how a method according to the present invention may be implemented will be described.

Software Package

It is assumed that the vendor distributes software upgrades to network operators by means of software packages, which contain everything required to perform the upgrade. This includes at least the following components:

1. The software that should be upgraded. The software on the network element may consist of several load modules which are upgraded independently. In this case, the package may include only the modules that are to be upgraded.
2. Software configuration. A description of the software modules included in this package and their dependencies on other software modules installed on the network element or included in this package. The configuration also includes a description of the hardware required to install this software. The recipe presented below uses this configuration.
3. One or more processes or techniques (later referred to as "recipes") used to execute each step of the upgrade process (3). These have to be tailored to support upgrade of the particular software delivered with this package. One alternative is to implement the technique using one script per step of the upgrade process (3), where each script includes the commands required to execute a step. For instance, a script may start by setting up a Telnet session towards the network element, issuing an appropriate sequence of commands, and analyzing the output.
4. Reference documentation for the new software. The upgrade process (3) is automated by this invention, hence no documentation is required for this purpose, but troubleshooting information may be necessary. It is also common to include transcripts of the verification test performed by the vendor.

Remote Upgrade Station (1)

In most cases, it is preferred to initiate software upgrades from a remote upgrade station (1) to avoid a visit to the network element site, and in order to run several upgrade sessions in parallel. FIG. 1 illustrates a sample upgrade station and the communication towards network elements. This communication may be carried together with the voice/data traffic or over a separate management network.

The figure also indicates the components which would typically be used to implement the upgrade station. This includes presentation, logic used to execute the upgrade, and element access. Presentation and element access are outside the scope of this invention, but included here for completeness. Element access is responsible for communication towards the network element's management interface. SNMP, CORBA or Telnet protocols are commonly used for this purpose.

The upgrade logic initiates and controls the software upgrade process (3) defined later. The upgrade logic will read the recipe and follow the steps defined therein. In order to make the upgrade process (3) run automatically, these steps should conform to the ones defined in this invention. The upgrade logic may be regarded as an interpreter program that performs the upgrade based on information contained in the recipe. This invention defines content of the recipe that is required to automate the upgrade.

Network Element (2)

FIG. 2 illustrates major components in a network element (2), but these may vary depending on the role of the network element (2). What is important with regards to this invention, is that the network element (2) must implement some sort of management interface, which may be realized using available standards (e.g. SNMP, CORBA, FTP and Telnet) or vendor specific protocols.

Commands are invoked on the management interface to perform the software upgrade from a remote location, e.g. there may be a set of commands for downloading the software to the network element (2) and another set for activating the software.

Naturally, the granularity of the management interface may vary from one network element (2) to another, and the trend is towards more high-level support implemented in the network element (2). This means that different network elements provide different levels of support for software upgrades, which again affects the level of control that the remote upgrade station (1) needs to enforce on the upgrade process (3). For older network elements, the station may need to issue a number of low-level commands for every step in the process (3), while newer elements may support a single high-level command for each step.

Upgrade Process (3)

The present invention assumes that software packages should include a recipe to automate the upgrade process (3). This recipe is embedded in a software upgrade package distributed to customers. The recipe should be considered as the foundation for building tools to automate the upgrade process (3), and the customer need not be concerned about the nature of the recipe.

The present invention specifies a number of steps that need to be covered in order to perform a successful upgrade of a network element (2), and every step needs to be covered by the recipe embedded in the software package. The steps involved in the upgrade process (3) are illustrated in FIG. 3.

The recipe is assumed to handle exceptional situations during every step of the upgrade process (3), but of course, it is practically impossible to cover every possible situation. In this case, a step will exit with a NOK result code as indicated in the figure, which aborts the upgrade process (3) and initiates rollback and cleanup activities if required. The latter depends on how far the upgrade has progressed before a critical incident occurs that the script cannot catch.

The steps required to automate the software upgrade process (3) are further described below. However, detailed execution of each step is outside the scope of this invention, since it largely depends on the management interface towards the network element (2).

Download Software to Network Element (4):

The download (4) of software to the network element does not necessarily need to be covered by the recipe to automate the upgrade, but the step is included here for completeness. The remote upgrade tool is responsible for implementing this step, most likely by using an available file transfer mechanism like FTP, NFS, or the like. The step itself includes transferring the software that are to be upgraded from the file server connected to the remote upgrade station (1) to the file system of the network element (2).

Software packages are likely to be distributed in ZIP or TAR format. The download step (4) needs to inflate the package in some designated directory on the remote upgrade station (1), and to initiate transfer of the software files to the network element (2).

By default, a delta of the software should be transferred to the node to optimize the bandwidth usage. Delta transfer means that components already existing in the node file system are not transferred. As an option, the operator may choose to transfer the complete set of software to the node. All components will then be transferred, even if they already exist in the node file system.

Pre Validate Hardware Configuration of Network Element (5):

There may be dependencies between the software modules to install and the hardware configuration of the network element (2) to upgrade. E.g. the software may require that a special I/O processor is installed or a higher stepping of the main processor.

Software/hardware dependencies should be checked prior to initiating any further upgrade activities, since they will ultimately force the upgrade to backtrack. A step of the recipe is designed to check these software/hardware dependencies for the software modules included in the package distributed.

The check is performed to assure that the new software is loadable in the current hardware configuration. The software configuration states the HW compatibility window for the delivered software. The compatibility window will be compared with the installed HW revision.

The check function will return OK/NOK status. If the check fails, the recipe will not continue unless the operator overrides the result. The operator is warned by the system that overruling of the negative result may lead to traffic disturbances.

Pre Validate Software Configuration of Network Element (5):

The step of the recipe is performed to assure that that the software in the package and the current executing software in the network element (2) are compatible, i.e. it is possible to perform a data conversion. This is done by comparing the software revision compatible window given by the configuration with the software revision of the running system.

In the situations where not all software modules on the network element (2) are upgraded, it is essential to check that the revision of the modules that are left untouched will work together with the upgraded modules. This is referred to as software-software dependencies.

The check function will return OK/NOK status. If the check fails, the recipe will not continue unless the operator overrides the result. The operator is warned by the system that overruling of the negative result may lead to traffic disturbances.

Pre Health Checks of Network Element (6):

This part is very specific for each network element (2) type, but generally includes checking the current status of the network element (2), and possibly taking the appropriate countermeasures to ensure that status is as required for the upgrade to progress.

The health check step normally includes checking the alarms pending for this network element (2) and any records logged in the syslog. It is also common to check the current load of the network element (2) to see if it is feasible to progress. At this point, the upgrade process (3) has not affected the network element (2), and consequently there is no need for roll-back if the step returns a NOK exit status.

Backup Existing Software on Network Element (7):

This step includes backup of the software that is to be upgraded. A backup may be performed by saving the HW and SW configuration settings, or by dumping the entire memory. Naturally, the latter option consumes far more space in the network element (2) file system.

The existing software may either be stored on the network element (2) file system, or the remote upgrade station's (1) file server. Storing the backup on the remote upgrade station (1) provides additional safety against data loss during the upgrade, since the network element (2) may become unavailable. However, remote storage also comes at a cost, since the transferring of the backup over a remote connection will consume bandwidth and may take hours to complete over a slow connection.

The normal procedure to handle failures during the upgrade procedure is that a return to the backup is made by the network element (2), by reloading the backup. There can be occasions when it is desirable not to return to the backup and instead make a forced reload with the new software.

Obtain Exclusive Access to Network Element:

This step includes actions required to obtain exclusive network management access to the network element (2) that is target for the upgrade. Only the remote upgrade station (1) should be allowed to manage the network element (2) during the upgrade. For instance, all statistics collection should be turned off during the upgrade.

If the software management application does not have exclusive access during the upgrade, it is practically impossible to automate the process, since other applications may execute management operations on the network element (2) that is not included in the recipe. External applications will introduce non-deterministic behavior into the upgrade that will be almost impossible to catch in the recipe.

Data Conversion on Network Element (8):

Before loading the new software, data conversions may have to be made. Data conversion may differ in complexity depending on the support provided by the network element (2). Necessary data conversion instructions for conversion of data structure and format are provided in a separate step in the recipe.

Old values will remain where appropriate. If a parameter value has to be recalculated, the conversion step handles this. In case of a new parameter (due to structure conversion), the parameter will get a default value from a default value in the software configuration. The operator should able to change the supplied default values to site-specific values.

Activate the New Software on Network Element (9):

Activating the new software modules may differ in complexity depending on the support provided by the network element (2). A separate step in the recipe should supervise the loading of modules from the network element (2) file system onto main and special processors. Note that some elements may also have additional processor types.

There are typically a number of different exceptional situations that may arise during activation, simply because it is a complex task to upgrade network elements (2) that is in operation. Problems or deficiencies that have not been discovered earlier, will often surface during activation. For this reason, the activation step needs to focus on exception handling, and support rollback of activations that could not be completed.

The order in which the load modules shall be loaded depends on interface compatibility rules. The step will define instructions to keep the interface compatibility. The step also contains instructions of where, i.e. which target processors the load modules belongs to, and the order in which the load modules shall be activated.

The step could provide checksum control during software loading.

Release Exclusive Access to Network Element:

This step includes releasing the exclusive access obtained earlier, and restarting any network management activities that was running prior to data conversion and activation of the network element (2). This may be implemented by having the "obtain exclusive access" step of the recipe save the activities that where running in some temporary storage, and then re-invoke the saved activities in this step.

Post Validate Software Configuration of Network Element (10):

A step is included to check that the software configuration performed after the upgrade complies with expected values. This is to ensure that the correct software revisions have actually been installed. The step is similar to the software validation performed prior to activation, but if the validation fails, the activation should be rolled back. For this reason, rollback functions needs to be provided in this step.

Post Health Checks of Network Element (11):

The post upgrade health checks are similar to the checks performed prior to the upgrade, but in this case, there may also be a need to rollback the activation if discovered that the network element (2) is not working properly.

Cleanup Temporary Files in Network Element File System (13):

During upgrade, a number of files may be temporarily stored in the network element (2) file system, and to resolve this situation, a cleanup step should be included in the recipe to finalize the upgrade process (3).

The present invention is intended for software upgrade of network elements, which may be seen as a special-purpose computer for use in communication networks. However, it may also be applied for software upgrade of general-purpose computers. In fact, network elements that realize application functions like unified messaging in next generation networks will be general-purpose computers.

Abbreviations

CORBA Common Object Request Broker Architecture
FTP File Transfer Protocol
HW Hardware
NE Network Element
NFS Network File System
O&M Operation and Maintenance
SNMP Simple Network Management Protocol
SW Software
TAR Tape Archive
ZIP ZIP is a common archive format Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. It is to be understood that the invention is not to be limited to the disclosed embodiment, but on the contrary, is intended to cover various modifications and equivalent arrangements.

The invention claimed is:

1. A method for installing or upgrading new software in network elements in a telecommunication system, where network elements implement routing, switching, and transport functions to establish communication between two or more network entities, the method comprising an automated process including the following sequential steps:
   (a) validating a hardware configuration of the network elements to assure that the new software is loadable in the hardware configuration;
   (b) performing a first validation of a software configuration of the network elements prior to activation of the new software to assure that the new software and the existing software are compatible;
   (c) performing a first condition check of the network elements prior to activation of the new software including checking to ensure that a status is as required for the activation of the new software and checking a current load of each of the network elements to determine a desirability of installing or upgrading the new software at the current load of that network element;
   (d) providing a certain workstation with exclusive network management access to the network elements;
   (e) activating the new software on the network elements and providing an OK value if carried through successfully and a NOK value if not;
   (f) releasing the exclusive network management access of the certain workstation;
   (g) performing a second validation of the software configuration of the network elements after activation of the new software to assure that the new software has been installed correctly and providing an OK value if carried through successfully and a NOK value if not;
   (h) performing a second condition check of the network elements after activation of the new software including checking to ensure that a status is as desired; and
   (i) cleaning up temporary files that may have been temporarily stored during installation or upgrade,
   wherein if the current load is determined to be too high for one of the network elements in step (c), then suspending the method for that network element.

2. The method as defined in claim 1, wherein prior to step (a), the new software is transferred from a remote workstation to the network elements.

3. The method as defined in claim 2, wherein prior to step (d), the existing software and configuration data are backed up in memory either on the network elements or on the remote workstation.

4. The method as defined in claim 1, wherein prior step (f), the automated process includes: performing data conversion including recalculating values and introducing new parameters in the existing software.

5. The method as defined in claim 1, wherein the step (h) includes checking alarms or logged records pending for each of the network elements.

6. The method as defined in claim 1, wherein prior to step (i) being initiated by a NOK value from step (e) or from step (g), the automated process includes undoing changes to the network elements.

7. The method as defined in claim 1, further comprising aborting the automated process if any one of the steps (a)-(h) is not successfully performed.

8. Apparatus for use in installing or upgrading new software in network elements in a telecommunication system, where network elements implement routing, switching, and transport functions to establish communication between two or more network entities, comprising:
   means for validating a hardware configuration of the network elements to assure that the new software is loadable in the hardware configuration;
   means for performing a first validation of a software configuration of the network elements prior to activation of the new software to assure that the new software and the existing software are compatible;
   means for performing a first condition check of the network elements prior to activation of the new software including checking to ensure that a status is as required for the activation of the new software and checking a current load of each of the network elements to determine a desirability of installing or upgrading the new software at the current load of that network element;
   means for providing a certain workstation with exclusive network management access to the network elements;
   means for activating the new software on the network elements and for providing an OK value if carried through successfully and a NOK value if not;
   means for releasing the exclusive network management access of the certain workstation;
   means for performing a second validation of the software configuration of the network elements after activation of the new software to assure that the new software has been installed correctly and for providing an OK value if carried through successfully and a NOK value if not;
   means for performing a second condition check of the network elements after activation of the new software including checking to ensure that a status is as desired;
   means for cleaning up temporary files that may have been temporarily stored during installation or upgrade; and
   means for suspending installing or upgrading the new software at one of the network elements if the current load for that network element is determined to be too high.

9. The apparatus as defined in claim 8, further comprising means for transferring the new software from remote workstation to the network elements.

10. The apparatus as defined in claim 8, further comprising means for recalculating values and introducing new parameters in the existing software.

11. The apparatus as defined in claim 8, further comprising means for checking a current load, alarms, or logged records pending for each of the network elements.

12. The apparatus as defined in claim 8, further comprising means for aborting the installation of or the upgrade with the new software if one or more of the means in claim 14 does not successfully complete its function.

13. A computer-readable medium having computer executable software code stored thereon for use in installing or upgrading new software in network elements in a telecommunication system, where network elements implement routing, switching, and transport functions to establish communication between two or more network entities, comprising:
   code to validate a hardware configuration of the network elements to assure that the new software is loadable in the hardware configuration;
   code to perform a first validation of a software configuration of the network elements prior to activation of the new software to assure that the new software and the existing software are compatible;
   code to perform a first condition check of the network elements prior to activation of the new software including checking to ensure that a status is as required for the activation of the new software and checking a current load of each of the network elements to determine a desirability of installing or upgrading the new software at the current load for that network element;

code to provide a certain workstation with exclusive network management access to the network elements;

code to activate the new software on the network elements and for providing an OK value if carried through successfully and a NOK value if not;

code to release the exclusive network management access of the certain workstation;

code to perform a second validation of the software configuration of the network elements after activation of the new software to assure that the new software has been installed correctly and for providing an OK value if carried through successfully and a NOK value if not;

code to perform a second condition check of the network elements after activation of the new software including checking to ensure that a status is as desired;

code to clean up temporary files that may have been temporarily stored during installation or upgrade;

code for suspending installing or upgrading the new software for one of the network elements if the current load at the network element is determined to be too high.

14. The computer-readable medium as defined in claim 13, further comprising code to transfer the new software from a remote workstation to the network elements.

15. The computer-readable medium as defined in claim 13, further comprising code to recalculate values and introduce new parameters in the existing software.

16. The computer-readable medium as defined in claim 13, further comprising code to check a current load, alarms, or logged records pending for each of the network elements.

17. The computer-readable medium as defined in claim 13, further comprising code to abort the installation of or upgrading with the new software.

* * * * *